United States Patent [19]

Stevenson

[11] 4,247,733
[45] Jan. 27, 1981

[54] ELECTRICALLY HEATED GLASS FOREHEARTH

[75] Inventor: James F. Stevenson, West Hartford, Conn.

[73] Assignee: Emhart Industries, Inc., Farmington, Conn.

[21] Appl. No.: 69,938

[22] Filed: Aug. 27, 1979

[51] Int. Cl.³ .............................................. C03B 5/02
[52] U.S. Cl. .................................. 13/6; 13/24
[58] Field of Search ................................ 13/6, 23, 24

[56] References Cited
U.S. PATENT DOCUMENTS

| 3,585,267 | 6/1971 | Obersby | 13/6 |
| 3,836,689 | 9/1974 | Holler et al. | 13/6 |
| 3,967,046 | 6/1976 | Froberg | 13/6 |

Primary Examiner—Roy N. Envall, Jr.
Attorney, Agent, or Firm—McCormick, Paulding & Huber

[57] ABSTRACT

The forehearth provides a channel for the flow of molten glass from a tank type furnace to a feeder bowl or the like in order to feed gobs of glass to one of several glassware forming machines provided with glass from a single furnace tank. The forehearth channel has sets of electrodes arranged in each of three discrete zones along the forehearth channel, with the center electrode being at a predetermined and controlled potential with respect to electrodes located at the upstream and downstream ends of each zone. The electrode associated with the downstream end of one zone is also used as the upstream electrode associated with the adjacent zone, and the glass is heated by virtue of the fact that these electrodes are immersed in the glass, with an A.C. single phase voltage being impressed thereon. Individual transformers are provided for each of the zones, and controllers for the primary of each transformer operate in response to current sensed at the downstream end of each zone, the voltage at the secondary of each transformer, and also in response to a correction signal provided for each controller and derived from a glass level measuring device associated with the upstream end of the forehearth itself.

6 Claims, 1 Drawing Figure

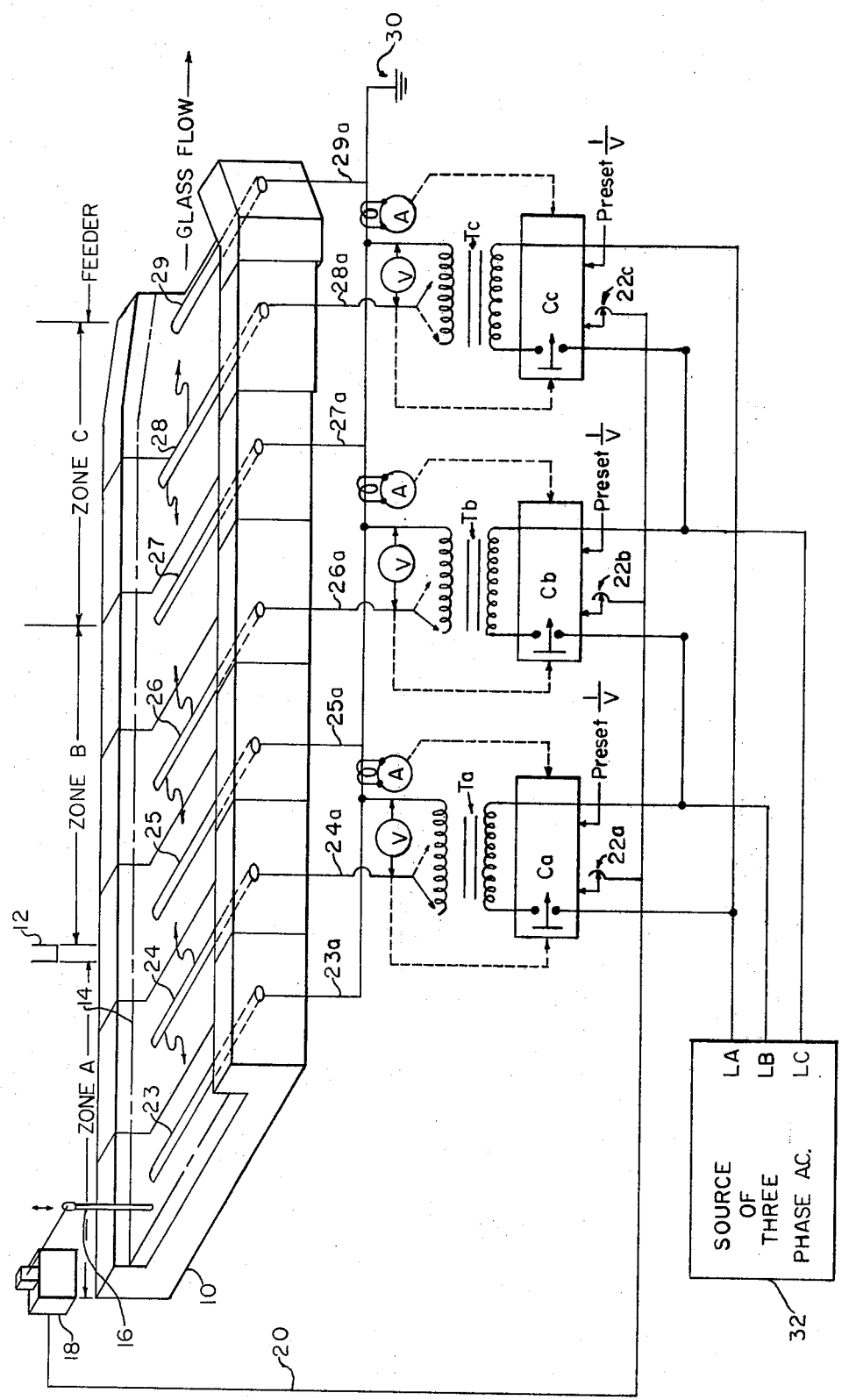

ELECTRICALLY HEATED GLASS FOREHEARTH

SUMMARY OF THE INVENTION

This invention relates generally to electrically heated forehearth furnaces and deals more particularly with a forehearth channel having sets of electrodes for each of the discrete temperature zones within the furnace.

The general object of the present invention is to provide a control system for such a forehearth furnace wherein three phase line voltage is provided to the circuitry, and wherein each of three zones are independently controlled by reference to the electrical conductance, and temperature, adjacent the exit ends of each of these zones providing a degree of versatility hereto not available in electrically heated forehearths generally.

In accordance with the present invention at least two electrodes are disposed centrally of a like number of zones in the forehearth, and common interzonal electrodes are provided at a common electrical potential, these common electrodes being provided between the center electrodes, and others at opposite ends of the forehearth furnace. Control circuitry is provided to impress single phase A.C. electrical power at varying voltages upon the electrodes in each of these zones from a source of conventional three phase A.C. power. Transformer means are provided for each of these zones, the secondary windings for each of these transformers being coupled to the electrodes centered in each zone, and the common electrodes provided at the upstream and downstream ends of each zone, so that a parallel circuit is created to the electrodes in each zone. Current flows from the centered electrode through the molten glass to both of the common electrodes in each zone and through the secondary winding of the transformer. Current transformers are provided in association with the downstream loop of the parallel circuit, and voltage is sensed at the secondary winding of each transformer, so that a controller can be fed these outputs and a ratio (I/V) calculated at the controller for comparison to a preset value of current ÷ voltage such that a simple comparison step can be used to switch the primary transformer windings on or off, individually for each zone, in accordance with the results of this comparison. A glass level detection device is provided at the upstream end of the forehearth, and the controller is adapted to be preconditioned to compensate for variations in the depth of the glass, and the effect of such variations on the resistance of the glass to the flow of electricity through it.

BRIEF DESCRIPTION OF THE DRAWING

FIG. 1 is a schematic view illustrating the present invention with respect to a forehearth furnace channel, in perspective, and also shows the orientation of the various electrodes in the three zones of the furnace also shown.

DETAILED DESCRIPTION

Turning now to the drawing in greater detail, the direction of glass flow is left to right as indicated by the arrow, and a source of molten glass such as a glass tank or furnace (not shown) is provided at the upstream end of the channel 10, which channel is divided into three control or heating zones A, B and C between this source of molten glass and a feeder at the downstream end. The zones within the forehearth are preferably maintained at temperatures which differ from one another, and a baffle 12 may be provided between zones A, B and C to isolate this difference in temperature is maintained for the glass 14 flowing through the channel 10. The glass 14 is preferably maintained at a constant depth in the channel 10, and this depth is monitored by a platinum probe 16, which probe is adapted to move vertically in response to a conventional control circuit associated with maintaining a constant glass level, customarily also recorded. This system periodically senses the height of the glass electrically. Such glass level detecting devices are well known in the art, being used to control the quantity of batch material dumped into the batch tank or furnace upstream of the forehearth channel 10. Thus, the glass level 14 is preferably maintained at a predetermined height, but any variation therefrom will be detected by the device 18 and fed, through line 20, to the various controllers Ca, Cb and Cc to be described below. It should be noted that the glass level feedback inputs to these controllers Ca, Cb and Cc, from line 20, can be individually varied by means of an external manually set potentiometer device associated with each of these controllers as shown schematically at 22a, 22b and 22c respectively. Thus the degree of level compensation can be selected as desired for each zone.

The forehearth channel is heated by longitudinally spaced electrodes 23, 24, 25, 26, 27, 28 and 29. Each of these electrodes extends horizontally transversely across the channel to a point close to near the opposite side wall of the channel 10, and the near end of each electrode is mounted in the near side wall of the channel 10 such that leadout wires, 23a–29a inclusively associated with each of these electrodes, can be connected to the control circuitry for energizing these electrodes and heating the glass therebetween by the JOULE effect resistance heating of the glass. These electrodes are immersed in the molten glass, and electricity flows from the center electrode in each zone 24, 26 and 28 in both the upstream and the downstream directions to four remaining "common" electrodes 23, 25, 27 and 29, which "common" electrodes are maintained at a common potential, and may be grounded for system isolation as indicated at 30 in FIG. 1.

Single phase A.C. current is provided to the electrodes in each of these zones A, B and C from the secondary windings of three transformers Ta, Tb and Tc which transformers have primary windings adapted to be energized controllably and selectively by the controllers Ca, Cb, and Cc, respectively. The forehearth may include individual cooling means in the form of forced air cooling in its upper region (not shown) and the above mentioned electrodes and associated control circuitry are provided to supply heat to the glass in the forehearth channel in order to maintain the electrical conductivity (inverse of electrical resistance) of the glass in each of these zones at a predetermined value. It is characteristic of molten glass generally that its conductance is directly related to its temperature and viscosity, with the result that control of the conductance for the glass does achieve control of its temperature and more specifically control of viscosity even in compensation for accidental composition changes.

The conductivity for the molten glass for each of the zones A, B and C is measured throughout the downstream half of each zone and more particularly by an ammeter A fed from a current transformer associated with the electrodes 25, 27 and 29 at the downstream end of each of these zones. The voltage at the secondary winding of each of the three transformers Ta, Tb and Tc is measured by a volt meter, applied as shown in FIG. 1, such that both the ampere and voltage measurements can be fed to the respective controllers Ca, Cb and Cc in order that these readings can be electrically divided to calculate an instantaneous ratio (or quotient) of current to voltage, which ratio is a direct measure of the instantaneous conductance for the molten glass at the downstream half of each of the zones A, B and C. These controllers Ca, Cb and Cc have means for presetting a desired ratio of current to voltage for each of these zones A, B and C, corresponding to a desired glass temperature. Each of the controllers Ca, Cb and Cc comprises a conventional SCR firing circuit, and is adapted to switch the transformers Ta, Tb and Tc respectively on or off depending upon the comparison made between this preset ratio of current to voltage and the instantaneous electrically derived value of the actual quotient of current divided by voltage as described above.

For example, in feeding glass in a test channel of the type described above, zone A was maintained at a temperature of 2,200° F. (1204° C.) by presetting controller Ca at a ratio (I/V) of 1.362 amperes per volt (mhos) and impressing a voltage (by the secondary of tranformer Ta) across the parallel circuits provided by the upstream and downstream electrodes 23 and 25 of 160 volts. In zone B, the glass temperature was maintained at 2,100° F. (1149° C.) by utilizing the same voltage, 160 volts, at the secondary winding of the transformer Tb, and presetting the ratio of current to voltage at controller Cb at 1.303 amperes per volt. Finally, the zone adjacent to the feeder itself was maintained at a temperature of 2,000° F. (1093° C.) with an impressed voltage of 110 volts at the secondary of transformer Tc and with a preset ratio of current to voltage of 1.613 amperes per volt. The current measured in the downstream loop of each of the pairs of electrodes associated with the three zones A, B and C was found to be 197.5 amperes at ammeter A associated with controllers Ca, 189 amperes at ammeter A associated with controller Cb, and 159 amperes at ammeter A associated with controller Cc. Thus, the three phase line voltage 32, provided to each of the controllers Ca, Cb and Cc as shown, was divided into unequal parts through the transformers Ta, Tb and Tc.

It is another important feature of the present invention that the impressed "full-on" voltage at the secondary winding of each of these transformers can be varied between approximately 160 volts and a value considerably lower, in the range between 80 volts, and even lower at the secondary or transformer Tc (55 volts to 110 volts). This is accomplished by the variable voltage taps shown. The lower taps are used to avoid large percentage SCR off time and hence low power factor penalties.

It is also noted that the glass depth at the upstream end of the forehearth furnace channel was maintained during the above mentioned experiment at approximately six inches. A constant glass level must be maintained within a approximately ±0.02 inches, and the above mentioned commercially available glass level controller is usually capable of this result. However, and for purposes of illustrating how a change in glass level can influence conductance, if the level drops by 0.04 inches, due to furnace charging problems for example. Then the electrically determined conductance of 2.33 amperes per volt will decrease in response to such a drop in glass level and path cross section by approximately 0.015 volts per ampere, which typically represents a change of 5 Farenheit degrees temperature. Thus, the input potentiometers 22a, 22b and 22c from the glass level detection device line 20 to the controller Ca, Cb and Cc, are intended to obviate this apparent temperature drop (or rise) and to permit these controllers to function in spite of slight variations in the level of the glass within the forehearth furnace channel. The actual settings used may best be determined empirically for a particular installation.

It should also be noted that the electrodes within a particular zone may be spaced equidistantly from one another, but that electrodes in the adjacent zone are usually spaced at a different distance from one another, and further, that the actual spacing between electrodes need not always be the same even within a particular zone of the forehearth furnace. In the example illustrated above for instance, the distance between electrode 24 and its associated common electrodes 23 and 25 was 44 inches. However, in zone B the distance between center electrode 26 and its common electrodes 25 and 27 was 40 inches. In the same illustration however the center electrode 28 in zone C was not centered between its common electrodes 27 and 29, but was spaced a distance of 28 inches from the upstream electrode 27, and 26 inches from the downstream electrode 29 to allow for its shorter length. This configuration was found to be well within the capability of operation for the controllers described above, and it is noted that the specific distance between the center electrodes 24, 26 and 28 need not necessarily be the same in both the upstream and downstream direction as measured to the respective common electrodes in the parallel branch circuits associated with these center electrodes.

In conclusion, and by way of summary, the above described electrode control circuitry provides a versatile system for electrically heating molten glass in a forehearth furnace with multiple discrete desired temperature zones. Only A.C. voltage and current will be applied to the electrodes in the glass because transformers Ta, Tb and Tc act as isolation transformers to cancel out any spurious D.C. voltages resulting from timing inaccuracies of the SCR type controllers Ca, Cb and Cc. The eliminates D.C. electrolysis in the glass and any resulting damage to the electrodes caused thereby. A satisfactory commercial SCR controller is available from Robican, 100 Sagamore Hill Rd., Plum Industrial Park, Pittsburgh, Pa. 15239, under Model No. 401. The use of a conventional SCR type controller, and the straightforward electronic calculation step (current-÷voltage) and comparison step (preset ratio with calculated quotient) affords a significant step forward in the control of molten glass forehearths. The glass level control feedback feature is particularly useful in forehearth-furnaces to compensate for this type of change to glass conductance.

I claim:

1. In a glassware furnace of the forehearth type wherein molten glass flows from a batch tank through a channel to a feeder bowl where the glass is discharged, the improvement comprising at least three electrodes disposed centrally of first, second and third zones in the forehearth which zones are to be kept at discrete glass temperatures, at least four common electrodes at a common electrical potential, two of the four common electrodes located between the three electrodes and the other two common electrodes spaced upstream and downstream from said first and third electrodes respectively, control circuit means to provide one phase A.C. electrical power to said three electrodes at potentials which may vary with respect to one another from a source of three phase A.C. line power, said control circuit means including transformer means for each of said three electrodes, each transformer means having a secondary winding coupled in series circuit to one of said three electrodes and in parallel circuit to two of said common electrodes so that current can flow from one of the three electrodes through the molten glass to two of the common electrodes and through said secondary, each transformer means including a primary winding energized by one of the three phases of said A.C. line power source, said control circuit means further including at least three electrical current sensing means providing output signals related to said electrode parallel circuit current, and control circuit means also including at least three electrical potential measuring means to provide outputs proportional to said secondary winding voltage, and said control circuit means having controller means including means to preset a desired ratio of electrode current to secondary voltage for each secondary, and means to compare the actual quotient of said output signal current for each of said three parallel circuits and said corresponding secondary winding voltage with said preset ratio, said controller means switching said each of the three primary transformer windings on or off individually in each A.C. cycle as said comparison shows the actual quotient to be less than or more than said preset ratio for each forehearth furnace zone.

2. The combination defined by claim 1 further characterized by a molten glass level detection device capable of providing an input to said controller means related to increases and decreases in glass level from a predetermined or operational level upon which the preset ratios of current to voltage are calculated, and means associated with said controller means to adjust said measured ratios downwardly in response to an increase in detected glass level and upwardly in response to a decrease in detected glass level from said predetermined glass level.

3. The combination defined by claim 1 wherein said two common electrodes, intermediate said three electrodes centered in the three discrete forehearth zones, are located at the boundaries of said zones, and wherein the current sensing means for each secondary more particularly comprises a current transformer adapted to measure the current flow in the downstream end only of an associated zone between the said centered electrode for one of said zones and the common electrode at the downstream end of that zone.

4. The combination defined by claim 3 wherein said secondary windings of each of said three transformer means includes a variable voltage tap to permit varying the voltage to the electrodes in each zone of the forehearth independently of one another.

5. The combination defined by claim 4 further characterized by a molten glass level detection device capable of providing an input to said controller means related to increases and decreases in glass level from a predetermined operational level upon which the preset ratios of current to voltage are calculated, and means associated with said controller means to adjust said measured ratios downwardly in response to an increase in detected glass level and upwardly in response to a decrease in detected glass level from said predetermined glass level.

6. In a glassware furnace of the forehearth type wherein molten glass flows from a batch tank through a channel to a feeder bowl where the glass is discharged, the improvement comprising at least two electrodes disposed centrally of two adjacent zones in the forehearth which zones are to be kept at discrete glass temperatures, at least three common electrodes at a common electrical potential, one of the common electrodes located between the two electrodes and the common electrode being spaced upstream and downstream from said centrally located electrodes respectively, control circuit means to provide one phase A.C. electrical power to said centrally located electrodes at potentials which may vary with respect to one another from a source of multi phase A.C. line power, said control circuit means including transformer means for each of said centrally located electrodes, each transformer means having a secondary winding energized by one of said centrally located electrodes and in parallel circuit to two of said common electrodes so that current can flow from one of the centrally located electrodes through the molten glass to two of the common electrodes and through said secondary, each transformer means including a primary winding energized by one of the three phases of said A.C. line power source, said control circuit means further including at least two electrical current sensing means providing output signals related to said electrode parallel circuit current, said control circuit means also including at least two electrical potential measuring means to provide outputs proportional to said secondary winding voltage, and said control circuit means having controller means including means to preset a desired ratio of electrode current to secondary voltage for each secondary, and means to compare the actual quotient of said output signal current for each of said two parallel circuits and said corresponding secondary winding voltage with said preset ratio, said controller means switching each of the primary transformer windings on or off individually in each A.C. cycle as said comparison shows the actual quotient to be less than or more than said preset ratio for each forehearth furnace zone.

* * * * *